(12) United States Patent
Grace et al.

(10) Patent No.: US 12,106,586 B2
(45) Date of Patent: Oct. 1, 2024

(54) LOST OBJECT TRACKING SYSTEM

(71) Applicant: GM Cruise Holdings LLC, San Francisco, CA (US)

(72) Inventors: Nestor Grace, San Francisco, CA (US); Katelyn Mary Wolfenberger, San Francisco, CA (US); Hooman Barekatain, Los Angeles, CA (US); Danyan Qian, Santa Clara, CA (US); Weichao Kong, Sunnyvale, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 116 days.

(21) Appl. No.: 17/705,972

(22) Filed: Mar. 28, 2022

(65) Prior Publication Data
US 2023/0306754 A1 Sep. 28, 2023

(51) Int. Cl.
G06V 20/59 (2022.01)
G06T 7/20 (2017.01)
G06T 7/70 (2017.01)
G06V 10/80 (2022.01)

(52) U.S. Cl.
CPC ............ *G06V 20/59* (2022.01); *G06T 7/20* (2013.01); *G06T 7/70* (2017.01); *G06V 10/803* (2022.01); *G06T 2207/30268* (2013.01)

(58) Field of Classification Search
CPC ........ G06V 20/59; G06V 10/803; G06T 7/70; G06T 7/20
See application file for complete search history.

(56) References Cited

U.S. PATENT DOCUMENTS

| 10,311,704 | B1* | 6/2019 | Xu ........................ G06V 10/454 |
| 10,882,538 | B1* | 1/2021 | Witt ....................... G01S 7/6272 |
| 2016/0332535 | A1* | 11/2016 | Bradley ................. G08B 21/24 |
| 2020/0257912 | A1* | 8/2020 | Qiu ........................ B25J 11/0085 |
| 2022/0092792 | A1* | 3/2022 | Chakraborty ........... G06T 19/20 |
| 2023/0046071 | A1* | 2/2023 | Arunmozhi ............. G01S 7/536 |

* cited by examiner

*Primary Examiner* — Rowina J Cattungal

(57) ABSTRACT

A method includes determining that an object has fallen to a surface of interest in an interior cabin of a vehicle during a transportation service provided using the vehicle; tracking a location of the object on the surface of interest using at least one interior sensor; updating tracking information for the object, the tracking information including the tracked location of the object and a time at which the location was tracked; inferring a continued existence of the object after the object has moved out of a view of the at least one interior sensor and tagging the object as obscured from view in the tracking information for the object; identifying a user associated with the transportation service; and alerting the identified user to retrieve the object.

20 Claims, 8 Drawing Sheets

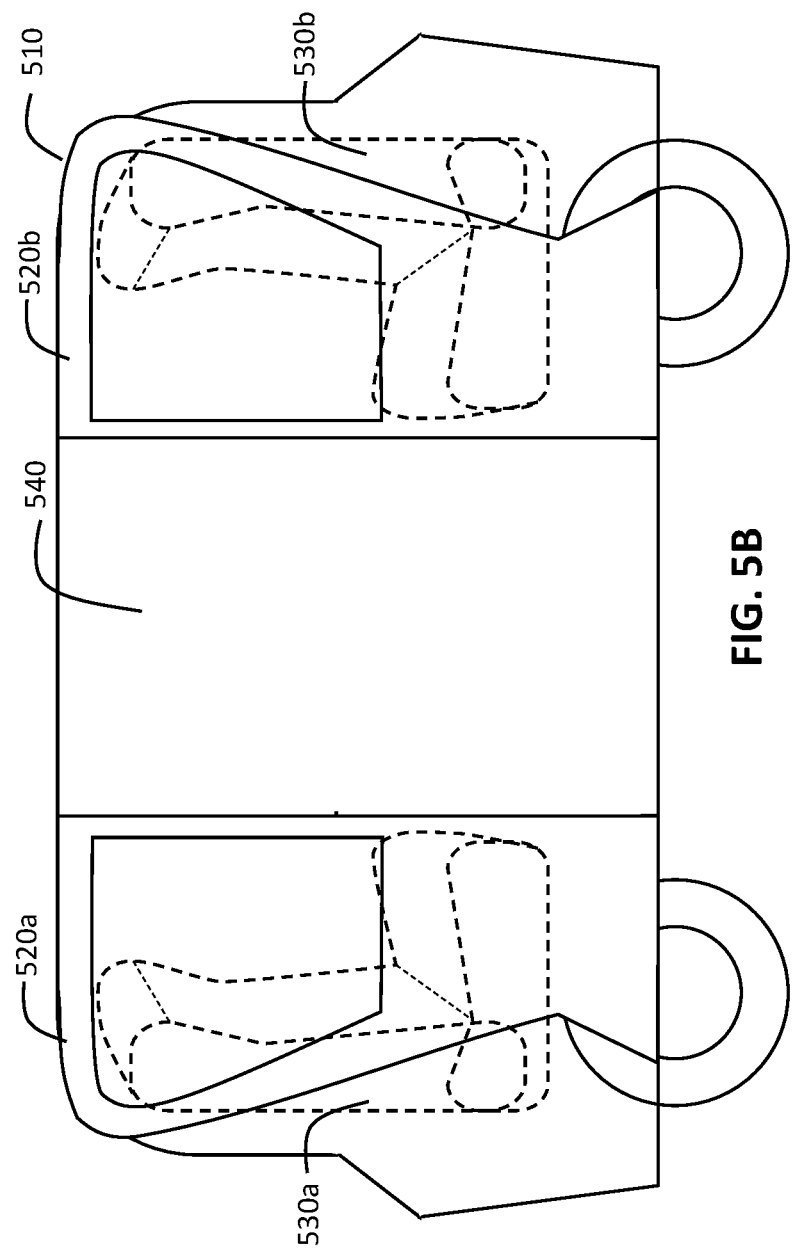

LOST OBJECT TRACKING SYSTEM

TECHNICAL FIELD OF THE DISCLOSURE

The present disclosure relates generally to autonomous vehicles and, more specifically, to devices and methods for a lost object tracking (LOT) system for use in such autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

FIGS. 5A-5C illustrate an example autonomous vehicle that may include a LOT system according to some embodiments of the present disclosure.

DESCRIPTION OF EXAMPLE EMBODIMENTS OF THE DISCLOSURE

Overview

Figure 1:
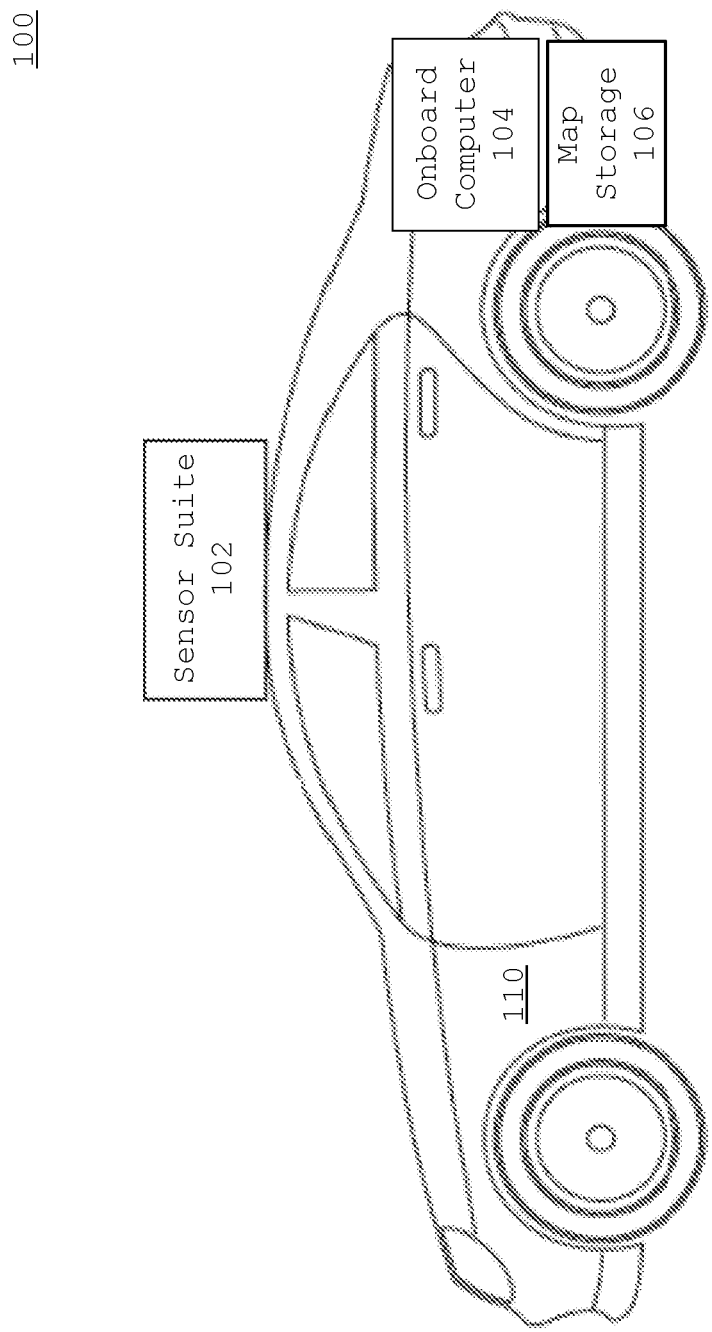
FIG. 1 is a diagram illustrating an example autonomous vehicle according to some embodiments of the present disclosure.

The systems, methods, and devices of this disclosure each have several innovative aspects, no single one of which is solely responsible for all of the desirable attributes disclosed herein. Details of one or more implementations of the subject matter described in this Specification are set forth in the description below and the accompanying drawings.

Given the numerous advantages of ride hail, rideshare, and delivery services (which services may be collectively referred to herein simply as "ride hail services") provided by autonomous vehicles, it is anticipated that autonomous vehicle ride hail services will soon become the ubiquitous choice for various user transportation needs, including but not limited to school commutes, airport transfers, and long distance road trips, to name a few.

Tracking of items dropped in autonomous vehicles during provision of ride and delivery services is important for both ride hail and delivery use cases of autonomous vehicle services. In particular, if an item falls into an area of the autonomous vehicle out of sight of the interior camera(s), (e.g., under one of the seats) the item may go undetected until it is too late to alert the owner of the item (e.g., the passenger who dropped the item or the user who ordered the delivery service) and/or return or deliver the item to the owner in an expeditious manner. The ability to track an out of sight (OOS) item in real time (or close to real time) within the cabin of an autonomous vehicle would provide autonomous vehicle services companies with the awareness that an item remains in a vehicle and the ability to alert the owner of the item to retrieve the item (e.g., by identifying to the owner the tracked location of the item within the vehicle cabin as well as the identity of the item) before disembarking the vehicle/completing the delivery service or to notify the owner to collect the item from a designated location at a later time. If the tracked item is not of value to the owner (i.e., the item is determined to be trash), detection of the item would enable the autonomous vehicle services company to remove it from the vehicle for proper disposal during vehicle servicing, as well as to bring in the vehicle for servicing if the item needs to be disposed of before further ride and/or delivery services are provided by the vehicle. In short, in both ride hail (or rideshare) and delivery use cases, the ability to track an item while it remains occluded from view enables prompt and proper recovery and/or disposition of the item.

As will be appreciated by one skilled in the art, aspects of the present disclosure, in particular aspects of embodiments described herein, may be embodied in various manners (e.g., as a method, a system, an autonomous vehicle, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps, and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110a-110e), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or 1 other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example Autonomous Vehicle

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensory data from the sensor suite 102 to determine its location, to navigate traffic, to sense and avoid obstacles, and to sense its surroundings. In addition to sensors located on the exterior of the autonomous vehicle, sensor suite 102 may include sensors disposed on the interior of the autonomous vehicle (e.g., within the cabin of the autonomous vehicle) for providing sensory data regarding passengers and objects inside the cabin of the autonomous vehicle 110. According to various implementations, the autonomous vehicle 110 may be part of a fleet of vehicles for picking up passengers and/or packages and driving to selected destinations. The autonomous vehicle 110 may be configured for ride management by an event host.

The sensor suite 102 includes localization and driving sensors. For example, the sensor suite may include one or more of photodetectors, cameras, radio detection and ranging (RADAR), SONAR, light ranging and detection (LIDAR), GPS, inertial measurement units (IMUs), accelerometers, microphones, strain gauges, pressure monitors, barometers, thermometers, altimeters, wheel speed sensors, and a CV system. The sensor suite 102 continuously monitors the autonomous vehicle's environment and, in some examples, sensor suite 102 data is used to detect selected events. In particular, data from the sensor suite can be used to update a map with information used to develop layers with waypoints identifying selected events, the locations of the encountered events, and the frequency with which the events are encountered at the identified location. In this way, sensor suite 102 data from many autonomous vehicles can continually provide feedback to the mapping system and the high-fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

The autonomous vehicle 110 is preferably a fully autonomous automobile but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, an airplane, a bike, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, horn honking, etc.

The autonomous vehicle 110 may include a map storage 106 for storing map data. The autonomous vehicle 110 may use the map data in various driving decisions, e.g., in finding optimal routes, in support of detecting objects along a route such as traffic lights, or for predicting behavior of other road users and planning autonomous vehicle behavior.

Example Autonomous Vehicle Fleet

Figure 2:
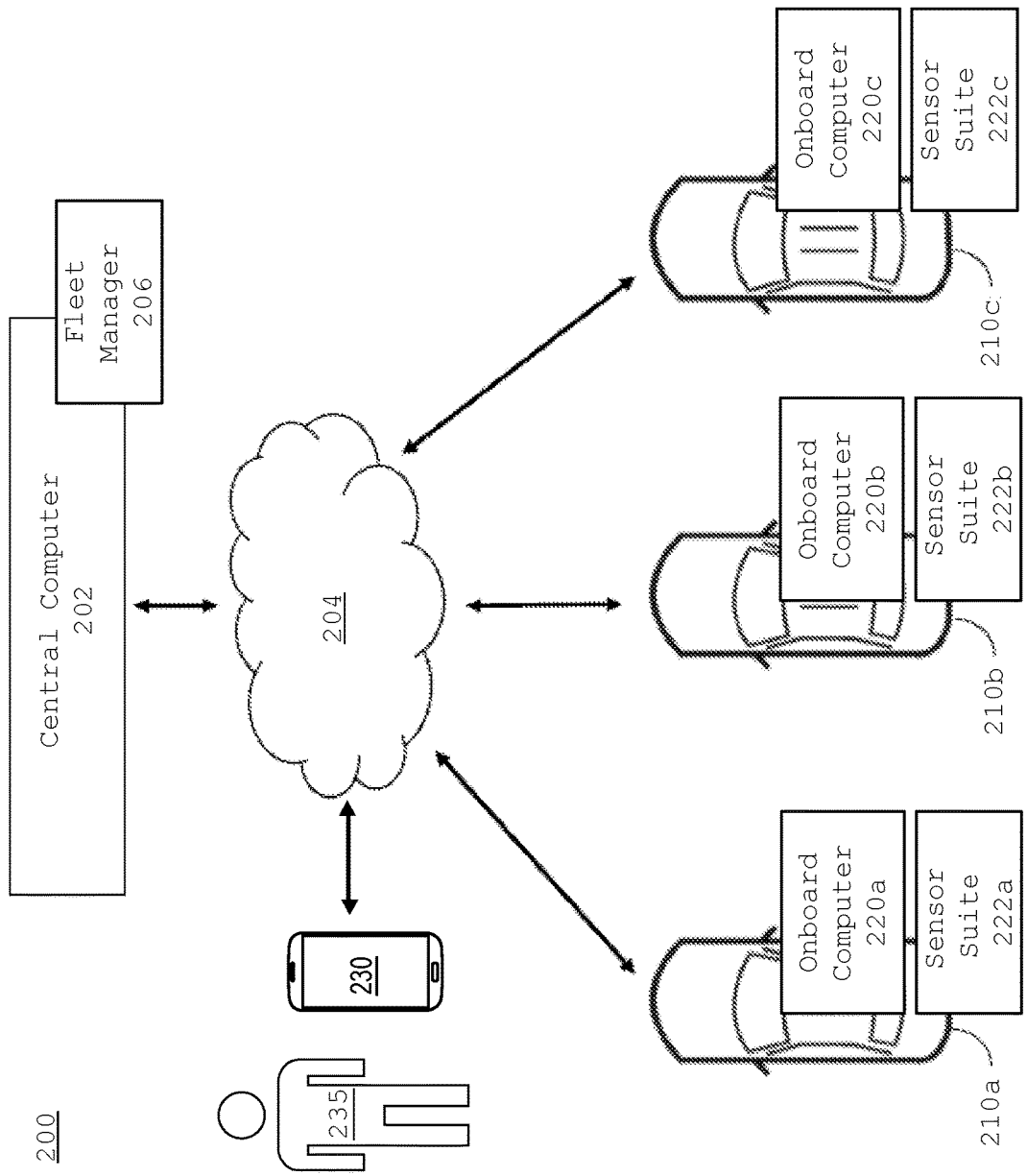
FIG. 2 is a diagram illustrating an example fleet of autonomous vehicles according to some embodiments of the present disclosure.

FIG. 2 is a diagram 200 illustrating a fleet of autonomous vehicles 210a, 210b, 210c in communication with a central computer 202 according to some embodiments of the disclosure. As shown in FIG. 2, the vehicles 210a-210c may communicate wirelessly with a central computer 202 and a cloud 204. The central computer 202 may include a fleet management system 206, which may include a routing coordinator and a database of information from the vehicles 210a-210c in the fleet. Each vehicle 210a-210c can include respective onboard computer 220a-220c and sensor suites 222a-222c, which can be similar to the onboard computer 104 and sensor suites 102 of FIG. 1.

The central computer 202 (and more particularly the fleet management system 206) may receive ride hail service requests for one of the autonomous vehicles 210 from user devices 230. Autonomous vehicle fleet routing refers to the routing of multiple vehicles in a fleet. In some implementations, autonomous vehicles communicate directly with each other. For example, a user 235 may make a request for ride hail service using a mobile app executing on the user device 230. The user device 230 may transmit the request directly to the fleet management system 206. The fleet management system 206 dispatches one of the autonomous vehicles 210a-210c to carry out the service request. When the dispatched one of the autonomous vehicles 210a-210c arrives at the pick-up location (i.e., the location at which the user is to meet the autonomous vehicle to begin the ride hail service), the user may be notified by the mobile app to meet the autonomous vehicle.

When a ride request is received from a passenger, the routing coordinator may select an autonomous vehicle 210a-210c to fulfill the ride request and generates a route for the autonomous vehicle 210a-210c. As described herein, in some examples, the routing coordinator selects more than one autonomous vehicle 210a-210c to fulfill the ride request. The generated route includes a route from the autonomous vehicle's present location to the pick-up location, and a route from the pick-up location to the final destination. In some examples, the generated route includes a route from the pick-up location to a selected waypoint, and a route from the selected waypoint to the final destination. In some examples, a first autonomous vehicle 210a drives the route to the waypoint and a second autonomous vehicle 210b drives the route from the waypoint to the final destination. In various examples, the route includes multiple waypoints and multiple autonomous vehicles. In some implementations, the central computer 202 communicates with a second fleet of autonomous vehicles, and a vehicle from the second fleet of autonomous vehicles drives the route from the waypoint to the final destination.

Each vehicle 210a-210c in the fleet of vehicles may communicate with a routing coordinator. Information gathered by various autonomous vehicles 210a-210c in the fleet can be saved and used to generate information for future routing determinations. For example, sensory data can be used to generate route determination parameters. In general, the information collected from the vehicles in the fleet can be used for route generation or to modify existing routes. In some examples, the routing coordinator collects and processes position data from multiple autonomous vehicles in real time to avoid traffic and generate a fastest time route for each autonomous vehicle. In some implementations, the routing coordinator uses collected position data to generate a best route for an autonomous vehicle in view of one or more traveling preferences and/or routing goals.

The routing coordinator uses map data to select an autonomous vehicle from the fleet to fulfill a ride request. In some implementations, the routing coordinator sends the selected autonomous vehicle the ride request details, including pick-up location and destination location, and an onboard computer (e.g., onboard computer 220a, 220b, or 220c) on the selected autonomous vehicle generates a route and navigates to the destination. In some examples, the routing coordinator also sends the selected vehicle one or more stops, including a charging station stop, for the autonomous vehicle to recharge. In some examples, the routing coordinator sends a first vehicle the pick-up location and a waypoint location, and the routing coordinator sends a second vehicle the waypoint location and the destination location, such that the passenger switches vehicles mid-ride. In some implementations, the routing coordinator in the central computer 202 generates a route for each selected autonomous vehicle 210a-210c, and the routing coordinator determines a route for the autonomous vehicle 210a-210c to travel from the autonomous vehicle's current location to a first stop.

Central computer 202 may include a model trainer for training classification models used to classify objects by applying machine learning techniques to training data. Classification models may be downloaded to onboard computers 220a, 220b, 220c, for use in classifying objects encountered by the autonomous vehicle 210a, 210b, 210c.

Example Onboard Computer

Figure 3:
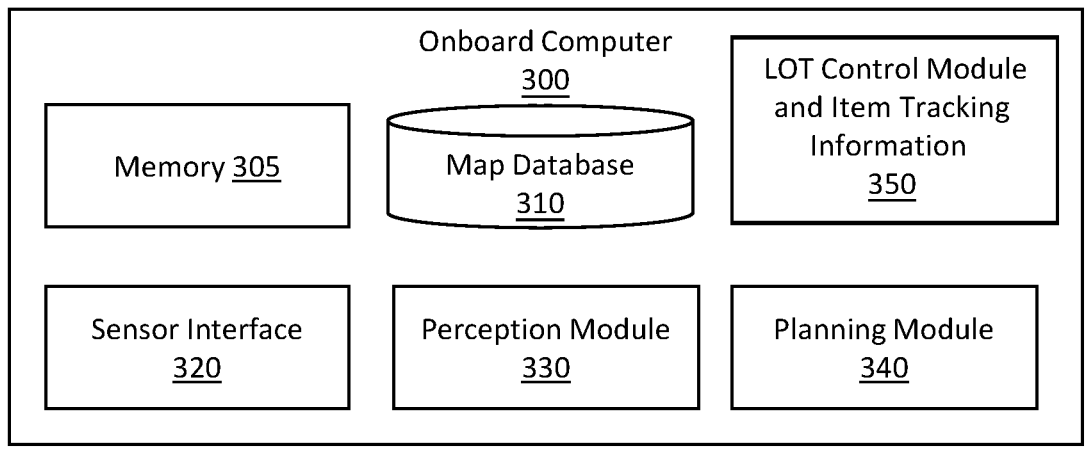
FIG. 3 is a diagram illustrating an onboard computer according to some embodiments of the present disclosure.

FIG. 3 is a block diagram illustrating an onboard computer 300, which may be used to implement onboard computer 104 (FIG. 1) and onboard computers 220 (FIG. 2) for enabling features according to some embodiments of the present disclosure. The onboard computer 300 may include memory 305, a map database 310, a sensor interface 320, a perception module 330, a planning module 340, and a LOT control module and item tracking information 350. In alternative configurations, fewer, different and/or additional components may be included in the onboard computer 300. For example, components and modules for controlling movements of the vehicles 110, 210, and other vehicle functions, and components and modules for communicating with other systems, such as central computer 202 and/or cloud 204, are not shown in FIG. 3. Further, functionality attributed to one component of the onboard computer 300 may be accomplished by a different component included in the onboard computer 300 or a different system from those illustrated.

The map database 310 stores a detailed map that includes a current environment of the vehicle. The map database 310 includes data describing roadways (e.g., locations of roadways, connections between roadways, roadway names, speed limits, traffic flow regulations, toll information, etc.) and data describing buildings (e.g., locations of buildings, building geometry, building types). The map database 310 may further include data describing other features, such as bike lanes, sidewalks, crosswalks, traffic lights, parking lots, etc.

The sensor interface 320 interfaces with the sensors in the sensor suite of the vehicle (e.g., sensor suite 102 (FIG. 1)). The sensor interface 320 may request data from the sensor suite, e.g., by requesting that a sensor capture data in a particular direction or at a particular time. The sensor interface 320 is configured to receive data captured by sensors of the sensor suite. The sensor interface 320 may have subcomponents for interfacing with individual sensors or groups of sensors of the sensor suite, such as a thermal sensor interface, a camera interface, a LIDAR interface, a RADAR interface, a microphone interface, etc. The sensor interface 320 may interface with sensors disposed both inside and outside the vehicle.

The perception module 330 identifies objects in the environment of the vehicle. The sensor suite produces a data set that is processed by the perception module 330 to detect other cars, pedestrians, trees, bicycles, and objects traveling on or near a road on which the vehicle is traveling or stopped, and indications surrounding the vehicle (such as construction signs, traffic cones, traffic lights, stop indicators, and other street signs). For example, the data set from the sensor suite may include images obtained by cameras, point clouds obtained by LIDAR sensors, and data collected by RADAR sensors. The perception module 330 may include one or more classifiers trained using machine learning to identify particular objects. For example, a multi-class classifier may be used to classify each object in the environment of the vehicle as one of a set of potential objects, e.g., a vehicle, a pedestrian, or a cyclist. As another example, a human classifier recognizes humans in the environment of the vehicle, a vehicle classifier recognizes vehicles in the environment of the vehicle, etc.

The planning module 340 plans maneuvers for the vehicle based on map data retrieved from the map database 310, data received from the perception module 330, and navigation information, e.g., a route instructed by the fleet management system. In some embodiments, the planning module 340 receives map data from the map database 310 describing known, relatively fixed features and objects in the environment of the vehicle. For example, the map data includes data describing roads as well as buildings, bus stations, trees, fences, sidewalks, etc. The planning module 340 receives data from the perception module 330 describing at least some of the features described by the map data in the environment of the vehicle. The planning module 340 determines a pathway for the vehicle to follow. The pathway includes locations for the vehicle to maneuver to, and timing and/or speed of the vehicle in maneuvering to the locations.

The LOT control module and item tracking information 350 may interact with other modules of the onboard computer 300 and other modules and systems to control and provide various aspects of the functionality and features of embodiments described herein and particularly as described below with reference to FIGS. 6 and 7. In particular, and will be described in greater detail below, the LOT control module and item tracking information 350 may interface with the sensor interface 320 to track items within the cabin of the vehicle and may interface with a central computer, such as central computer 202 (FIG. 2), and elements thereof to alert individuals that they have left items in the vehicle. The LOT control module and item tracking information 350 may also interact with the perception module 330 to determine the identity of objects being tracked within the cabin of the vehicle.

Example Fleet Management System

Figure 4:
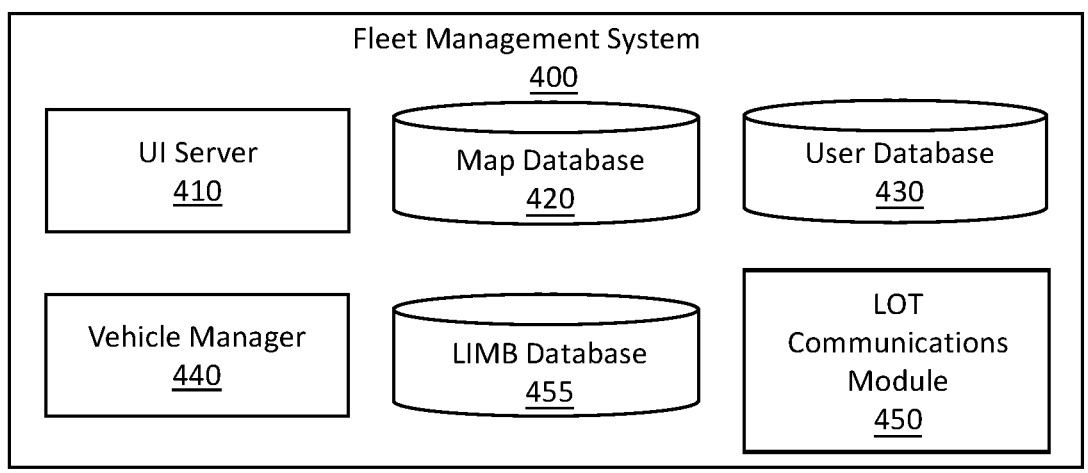
FIG. 4 is a diagram illustrating a fleet management system according to some embodiments of the present disclosure.

FIG. 4 is a block diagram illustrating a fleet management system 400, which may be implemented by central computer 202 (FIG. 2), according to some embodiments of the present disclosure. The fleet management system 400 includes a user interface (UI) server 410, a map database 420, a user database 430, a vehicle manager 440, a LOT communications module 450, and a Lost Item Management Book (LIMB) database 455. In alternative configurations, different, additional, or fewer components may be included in the fleet management system 400. Further, functionality attributed to one component of the fleet management system 400 may be accomplished by a different component included in the fleet management system 400 or a different system than those illustrated.

The fleet management system 400 manages a fleet of autonomous vehicles, such as autonomous vehicle 110. The fleet management system 400 may manage one or more services that provide or use the autonomous vehicles, e.g., a service for providing rides to users with the autonomous vehicles, or a service that delivers items, such as prepared foods, groceries, or packages, using the autonomous vehicles. The fleet management system 400 may select an autonomous vehicle from the fleet of autonomous vehicles to perform a particular service or other task and instruct the selected autonomous vehicle to autonomously drive to a particular location (e.g., a designated pick-up location) to pick-up a user and/or drop off an order to a user. The fleet management system 400 may select a route for the autonomous vehicle to follow. The fleet management system 400 may also manage fleet maintenance tasks, such as charging, servicing, and cleaning of the autonomous vehicle. As illustrated in FIG. 2, the autonomous vehicles may communicate with the fleet management system 400. The autonomous vehicle and the fleet management system 400 may connect over a public network, such as the Internet.

The UI server 410 is configured to communicate with client devices that provide a user interface to users. For example, the UI server 410 may be a web server that provides a browser-based application to client devices, or the UI server 410 may be a user app server that interfaces with a user app installed on client devices. The UI enables the user to access a service of the fleet management system 400, e.g., to request a ride from an autonomous vehicle, or to request a delivery from an autonomous vehicle. For example, the UI server 410 receives a request for a ride that includes an origin location (e.g., the user's current location) and a destination location, or a request for a delivery that includes a pick-up location (e.g., a local restaurant) and a destination location (e.g., the user's home address).

The map database 420 stores a detailed map describing roads and other areas (e.g., parking lots, autonomous vehicle service facilities) traversed by a fleet of autonomous vehicles, such as vehicles 210 (FIG. 2). The map database 420 includes data describing roadways (e.g., locations of roadways, connections between roadways, roadway names, speed limits, traffic flow regulations, toll information, etc.), data describing buildings (e.g., locations of buildings, building geometry, building types), and data describing other objects (e.g., location, geometry, object type), and data describing other features, such as bike lanes, sidewalks, crosswalks, traffic lights, parking lots, etc. At least a portion of the data stored in the map database 420 is provided to onboard computers of vehicles in the fleet, such as onboard computer 300 (FIG. 3), as a map database 310 (FIG. 3), described above.

The user database 430 stores data describing users of the fleet of vehicles managed by fleet management system 400. Users may create accounts with the fleet management system 400, which stores user information associated with the user accounts, or user profiles, in the user database 430. The user information may include identifying information (name, username), password, payment information, home address, contact information (e.g., email and telephone number), and information for verifying the user (e.g., photograph, driver's license number). Users may provide some or all of the user information, including user preferences regarding certain aspects of services provided by the rideshare system, to the fleet management system 400. In some embodiments, the fleet management system 400 may infer some user information from usage data or obtain user information from other sources, such as public databases or licensed data sources.

The fleet management system 400 may learn one or more home addresses for a user based on various data sources and user interactions. The user may provide a home address when setting up his account, e.g., the user may input a home address, or the user may provide an address in conjunction with credit card information. In some cases, the user may have more than one home, or the user may not provide a home address, or the user-provided home address may not be correct (e.g., if the user moves and the home address is out of date, or if the user's address associated with the credit card information is not the user's home address). In such cases, the fleet management system 400 may obtain a home address from one or more alternate sources. In one example, the fleet management system 400 obtains an address associated with an official record related to a user, such as a record from a state licensing agency (e.g., an address on the user's driver's license), an address from the postal service, an address associated with a phone record, or other publicly available or licensed records. In another example, the fleet management system 400 infers a home address based on the user's use of a service provided by the fleet management system 400. For example, the fleet management system 400 identifies an address associated with at least a threshold number of previous rides provided to a user (e.g., at least 10 rides, at least 50% of rides, or a plurality of rides), or at least a threshold number of previous deliveries (e.g., at least five deliveries, at least 60% of deliveries) as a home address or candidate home address. The fleet management system 400 may look up a candidate home address in the map database 420 to determine if the candidate home address is associated with a residential building type, e.g., a single-family home, a condominium, or an apartment. The fleet management system 400 stores the identified home address in the user database 430. The fleet management system 400 may obtain or identify multiple addresses for a user and associate each address with the user in the user database 430. In some embodiments, the fleet management system 400 identifies a current home address from multiple candidate home addresses, e.g., the most recent address, or an address that the user rides to or from most frequently and flags the identified current home address in the user database 430.

The vehicle manager 440 directs the movements of the vehicles in the fleet managed by fleet management system 400 (e.g., vehicles 210 (FIG. 2)). The vehicle manager 440 receives service requests from users from the UI server 410, and the vehicle manager 440 assigns service requests to individual vehicles. For example, in response to a user request for transportation from an origin location to a destination location, the vehicle manager 440 selects a vehicle and instructs the vehicle to drive to the origin location (e.g., a passenger or delivery pick-up location), and then instructs the vehicle to drive to the destination location (e.g., the passenger or delivery destination location). In addition, the vehicle manager 440 may instruct vehicles to drive to other locations while not servicing a user, e.g., to improve geographic distribution of the fleet, to anticipate demand at particular locations, to drive to a charging station for charging, etc. The vehicle manager 440 also instructs vehicles to return to autonomous vehicle facilities for recharging, maintenance, or storage.

The LOT communications module 450 may interact with other modules of the onboard computer 300 and the fleet management system 400 (including the LIMB database 455) to manage and control various aspects of features and functionality of embodiments described herein and particularly as described below with reference to FIGS. 6 and 7.

In accordance with features of embodiments described herein, the LIMB database 455 may store records concerning items left behind in autonomous vehicles of the fleet, including items identified by the LOT system described herein, and may be utilized to track various actions with respect to those items, such as the owner of the item (who may be identified using the identity of the vehicle in which the item was traced as well as the time at which the item was detected and matching that information with service records), whether the owner has been notified, whether the item has been retrieved and/or otherwise returned to the owner, and any other disposition of the item as may be deemed useful in accordance with features of embodiments described herein.

Example Autonomous Vehicle for Use in Connection With LOT System

Figure 5A:
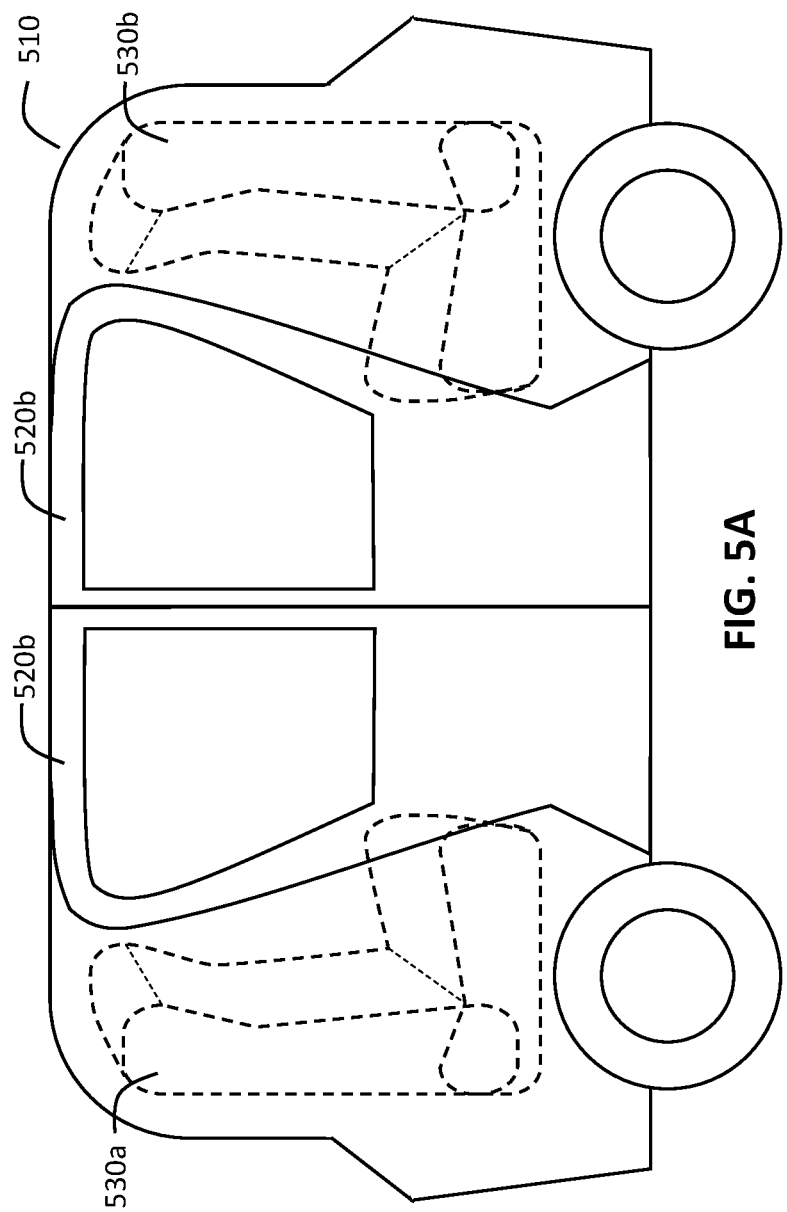

FIG. 5A illustrates an example autonomous vehicle 510, which is an example of the autonomous vehicle 110 described with respect to FIG. 1. The autonomous vehicle 510 includes two outer doors 520*a* and 520*b* along one side of the autonomous vehicle 510. In some embodiments, the autonomous vehicle 510 includes two similar doors on the side of autonomous vehicle opposite the side that includes the doors 520*a* and 520*b*. The doors 520*a*, 520*b*, provide access to an interior cabin 540 of the autonomous vehicle 510, which may be used for passenger seating. In the embodiment illustrated in FIG. 5A, the interior cabin 540 includes two rows of seats 530*a* and 530*b* arranged facing each other with a gap in between the rows of seats 530.

To provide access to the main cabin 540 of the autonomous vehicle 510, the left door 520*a* slides towards the left and the right door 520*b* slides to the right. FIG. 5B illustrates the autonomous vehicle 510 with its doors 520*a* and 520*b* open to allow access to the main cabin 540. An area between the seats 530*a* and 530*b* corresponds to a portion of the main cabin 540 that is available to transport delivery items. The interior cabin 540 of the autonomous vehicle 510 includes the passenger seats 530 and the area between the seats.

Figure 5C:
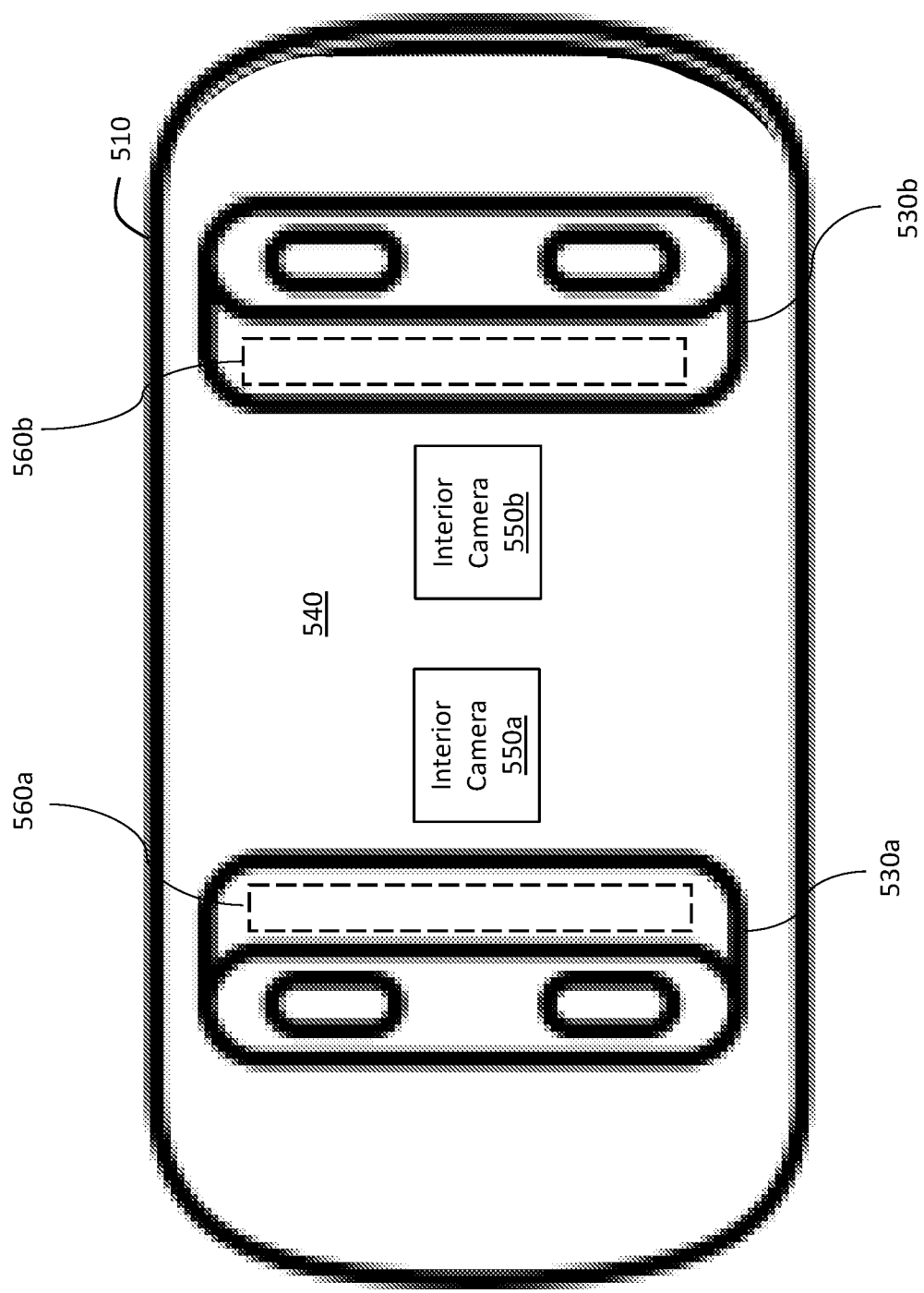

FIG. 5C illustrates an example "floor plan" of the autonomous vehicle 510 showing the area between the seats 530*a* and 530b. In alternate embodiments, the autonomous vehicle 510 may have a different configuration, e.g., with seats in different positions, doors in different positions, doors opening in different ways, etc. As also shown in FIG. 5C, autonomous vehicle 510 includes interior cameras, represented in FIG. 5C by cameras 550a, 550b, in the interior cabin 540. As illustrated in FIG. 5C, interior camera 550a may be located on one side of the interior cabin 540 (e.g., on or near the ceiling of the autonomous vehicle 510) and may be associated with and/or directed toward an area of the interior cabin 540 including seat 530a, while interior camera 550b may be located on the other side of the interior cabin 540 (e.g., on or near the ceiling of the autonomous vehicle 510) and may be associated and/or directed toward an area of the interior cabin 540 including seat 530b.

The cameras 550 are arranged in/on the autonomous vehicle in consideration of where users/passengers will be situated relative to/within the autonomous vehicle in a manner to maximize the quality sensory data obtained by and presented by the cameras (e.g., proximate and facing seats 530). Although two cameras 550 are shown, it will be recognized that more or fewer interior cameras may be provided as desired or required for a particular application and/or as dictated by costs and/or other considerations.

In accordance with features of embodiments described herein, auxiliary sensors 560 may be included in various areas of the interior cabin 540 of the autonomous vehicle 510, including but not limited to underneath the seats 530, as illustrated in FIG. 5C. Auxiliary sensors 560 may include but are not limited to one or more of weight sensors, touch sensors, ultrasonic sensors, and laser sensors.

In particular embodiments, while the autonomous vehicle 510 is executing a ride or delivery, one or more items that may fall onto the floor of the vehicle 510 may be detected by one or more of the cameras 550. If and when the dropped item rolls out of "sight" of the cameras 550 (e.g., under one of the seats 530), the auxiliary sensors 560 as well as other detection modalities may enable the tracking of the item while it is obscured from the view of the cameras 550. The auxiliary sensors 560 may also form part of the sensor suite (e.g., sensor suite 102) of the vehicle.

Leaving the seats 530a and 530b in the autonomous vehicle 510 when the autonomous vehicle 510 is configured for delivery enables the fleet manager to switch the autonomous vehicle 510 between a passenger mode and a delivery mode more easily. In some cases, the seats 530a and 530b may be covered with a protective cover when the autonomous vehicle 510 is used for delivery. In other embodiments, seats 530a and 530b may be removed from the autonomous vehicle 510 when the vehicle is to be used for delivery services. In either case, an item comprising all or part of a delivery may fall to the floor of the vehicle 510 and become obscured from the view of the cameras 550 either by the seats 530 or other structure within the cabin 540.

Example LOT System Summary

In accordance with features of embodiments described herein, data from the various interior onboard sensors (e.g., cameras 550 and/or auxiliary sensors 560) is fused to enable the location of an OOS item (or object) within the cabin of an autonomous vehicle, the time at which the item fell onto the interior surface of interest (e.g., the floor of the cabin), the location and the time at which the item moved out of sight of the interior onboard camera(s) (i.e., became obscured from the view of the interior onboard camera(s)), and the amount of time the item has remained out of sight (obscured from the view) of the interior onboard camera(s), to be tracked. Particular embodiments implement a comprehensive item management system (including a LIMB database) to be able to confidently determine ownership of items left in vehicles of a fleet of vehicles and track the return of the items to their determined owners. Certain embodiments, or features thereof, may also be used to detect suspicious packages, dirt or other detritus left in a vehicle, or deteriorations of the interior of a vehicle and may be leveraged to place customer support calls and/or bring the vehicle in for servicing and removal of the item(s) when deemed necessary.

The placement of additional/auxiliary sensors may be informed by the continued tracking of where in the vehicle cabin items tend to get lost (or obscured from view), enabling continuous improvement of the LOT system described herein. While not necessary to track items, such additional sensors may also facilitate the tracking of the objects present in the vehicle and improve the precision and recall of the perception and tracking systems for other purposes within the cabin.

In accordance with features of embodiments described herein, the onboard computer may utilize predictive technology to infer the continued presence of an item in an occluded space or location. This inference may be fused with sensory data from the interior onboard sensors noted above. The onboard computer of the autonomous vehicle may note when a previously OOS item returns to view and tag it as an existing item, as opposed to a newly fallen item.

Additional methods for locating fallen items may be employed, such as sloped floors, sticky floors and/or netting to prevent objects entering occluded areas. In accordance with features of embodiments described herein, the LIMB database may be maintained at the fleet management system and may be utilized to inform retrieval of items by the owner, or by staff of the autonomous vehicle service provider. Additionally, the LIMB database may provide an opportunity for the tracking of lost property and the reduction in the likelihood of lost property as an overall customer experience improvement tool.

Example Methods for LOT System Implementation and Operation

Figure 6:
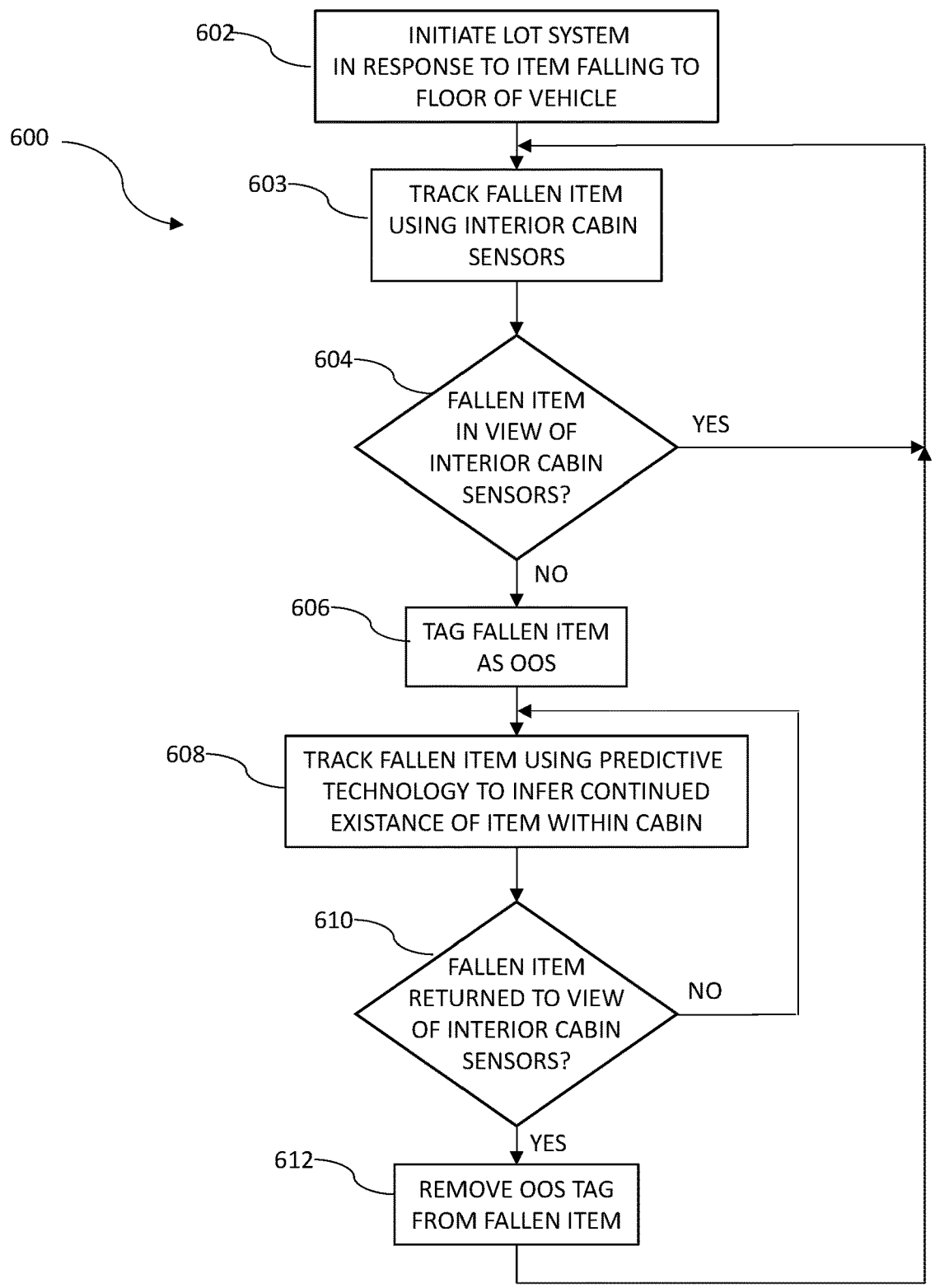
FIGS. 6 and 7 are flowcharts illustrating example processes for implementing a LOT system according to some embodiments of the present disclosure.
Figure 7:
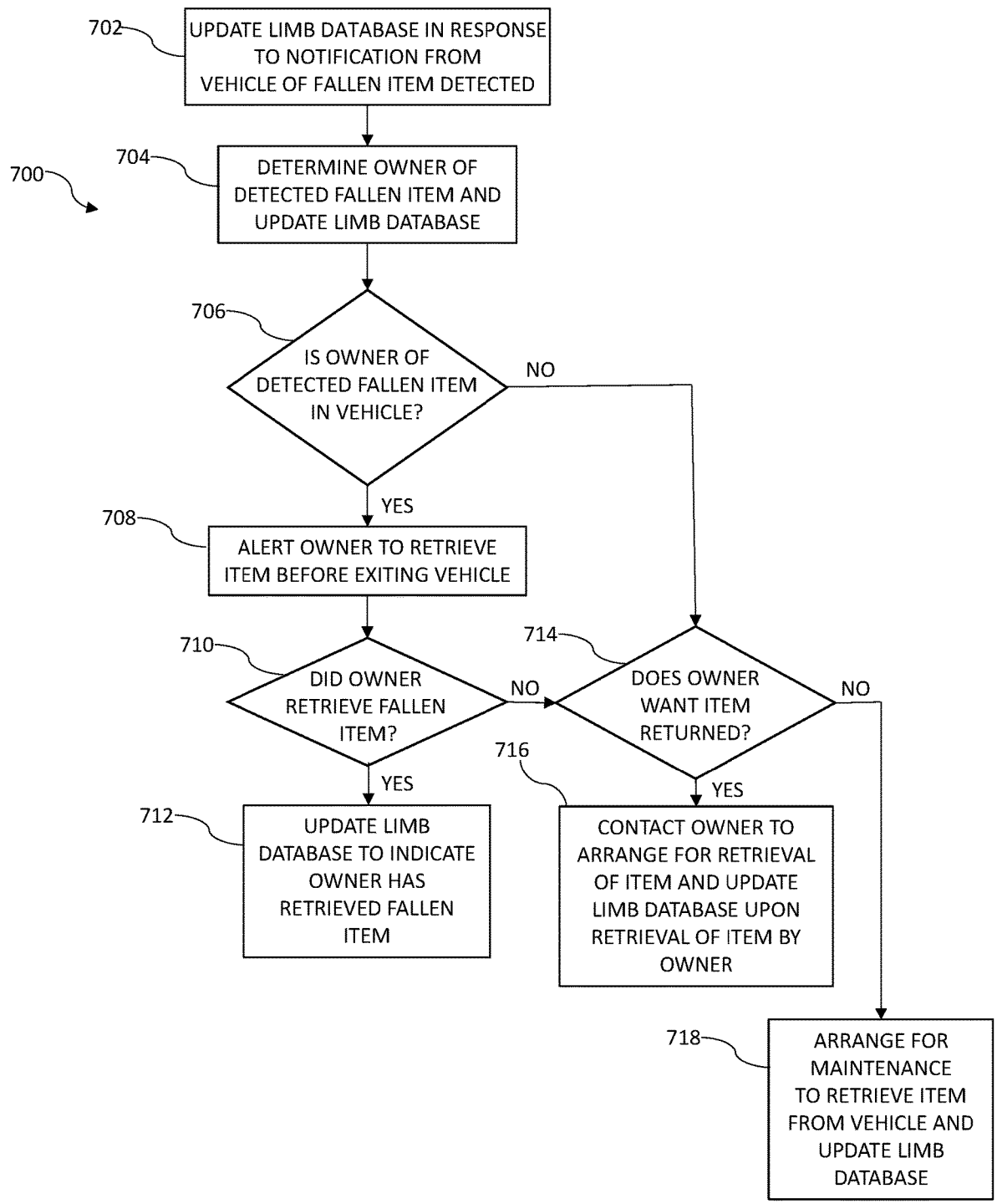

FIGS. 6 and 7 are flowcharts illustrating example processes for implementing a LOT system according to some embodiments of the present disclosure. It will be recognized that one or more of the steps illustrated in FIGS. 6 and 7 may be executed by one or more of the elements shown in FIGS. 3 and/or 4.

FIG. 6 is a flowchart 600 illustrating an example method of implementing a LOT system for tracking items (or objects) in an autonomous vehicle in accordance with features described herein. In particular embodiments, some or all of the operations of the example method illustrated in FIG. 6 are implemented by or in connection with an onboard computer of an autonomous vehicle, such as the onboard computer 300 (FIG. 3).

Execution begins in step 602 in response to an item falling to the floor (or other surface of interest), for example, or other surface of interest within the cabin of an autonomous vehicle during provision of an autonomous vehicle service (e.g., a delivery service or ride service). In step 602, the LOT system begins tracking the fallen item (e.g., by creating a tracking record for the item). In particular embodiments, the initial tracking information recorded for a fallen item includes the location at which the item fell (or landed) and the time at which the item fell. It will be recognized that execution of the LOT system may be initiated in response to other "triggers" and that a fallen item is only one such trigger.

In step 603, the fallen item is tracked using sensory data from cameras, which may be fused with sensory information from other sensors disposed within the cabin (e.g., as illustrated above with reference to FIG. 5C) as well as any other available information, and the tracking information (or tracking record) for the item is updated. In particular embodiments, the tracking information may be updated to include a new location for the item (periodically and/or in response to detected movement of the item) and the time at which the item was in the designated location. Tracking of the fallen item may also include determining and recording an identity of the item (e.g., pen, book, mobile device), which identification may also be stored in the tracking information for the item.

In step 604, a determination is made whether the item is still within the view of the interior cameras/sensors. If it is determined that the item is still within the view of the interior cameras/sensors, execution returns to step 603; otherwise (i.e., if it is determined that the item is obscured from the view of the interior cameras/sensors), execution proceeds to step 606.

In step 606, the item is tagged as OOS (e.g., in the corresponding tracking record for the item).

In step 608, the continued presence of the item within the cabin while the item is obscured from view is inferred using predictive technology. Additionally and/or alternatively, sensory data from auxiliary sensors may be used to determine and/or track the location of the item while it is OOS. Additionally in step 608, the tracking information for the item is updated appropriately (e.g., with the inferred location(s) and/or existence of the item and the time(s) at which the inference(s) was/were made).

For example, in certain embodiments, there may be a known model of the vehicle (e.g., 3D model of the space in the vehicle (including surfaces and objects), angle/tilt of the vehicle, speed of the vehicle, etc.)). A sensor, e.g., a camera, may track the location and velocity of an item (e.g., a water bottle) onto the floor and under a seat because the movement of the water bottle is tracked (plus the information about the vehicle). Based on the sensor data and known model of the vehicle, it could be inferred that the water bottle rolled to some location that is obscured from the view of the camera but continued to exist.

In step 610, a determination is made whether the item has returned to the view of the interior cameras/sensors. If it is determined that the item has not returned to the view of the interior cameras/sensors (i.e., the item remains obscured from the view of the interior cameras/sensors), execution returns to step 608; otherwise, execution proceeds to step 612.

In step 612, the OOS designation is removed from the item (e.g., the OOS tag is removed from the corresponding tracking record for the item) and execution returns to step 603.

If at any point in the process illustrated in FIG. 6, an owner retrieves the item from the surface to which it has fallen, active tracking of the item is halted (e.g., the tracking information for the item is cleared or deleted). Additionally, as described in greater detail below, at any point(s) in the process shown in FIG. 6, the fleet management system may be notified that a fallen item has been detected in order to initiate an alert to the owner of the item. In particular embodiments, the notification may include some or all of the item tracking information described above.

FIG. 7 is a flowchart 700 illustrating an example method of managing items located in an autonomous vehicle using the LOT system described above (e.g., in connection with FIG. 6) in accordance with features described herein. In particular embodiments, some or all of the operations of the example method illustrated in FIG. 7 are implemented by or in connection with a fleet management system, such as the fleet management system 400 (FIG. 4).

In step 702, the LIMB database is updated in response to a notification from the LOT system of a vehicle that a fallen item has been detected. This notification may occur at any point during the operation of the LOT system as described in connection with FIG. 6. For example, notifications may occur immediately upon detection of a fallen item as well as after every change in status of the item as detected by the LOT system. Alternatively, notifications may automatically occur periodically after initial detection of a fallen item by the LOT system. As previously noted, the notification may include any or all of the tracking information for the item as gathered by the LOT system.

In step 704, the owner of the fallen item is determined and the LIMB database is updated to include the owner information. In some embodiments, the owner may be determined with reference to information contained in the user database to match a passenger or user (in the case of a delivery service) with the particular vehicle in which the item has been detected as well as the time of the detection, which may be associated with a particular ride or delivery service provided by the vehicle.

In step 706, a determination is made whether the owner of the detected fallen item is still in the vehicle. That is, a determination is made whether the service in connection with which the fallen item was detected is ongoing. If it is determined that the owner of the detected fallen item is still in the vehicle, execution proceeds to step 708.

In step 708, an alert is provided to the owner to retrieve the fallen item before exiting the autonomous vehicle. In some embodiments, the alert may be provided by playing an audio alert over one or more speakers provided within the cabin of the vehicle and/or via a user app provided on a mobile device of the owner. Additionally and/or alternatively, the alert may be provided visually using one or more display devices provided within the cabin of the vehicle and/or via the UI of a user app provided on a mobile device of the owner. It is anticipated that other types of alerts may be provided without departing from the spirit or scope of embodiments described herein.

In step 710, a determination is made whether the owner has retrieved the fallen item. This operation may be accomplished using sensory data available from the interior onboard cameras provided in the cabin of the vehicle. In particular, the video data may be analyzed to determine whether the owner has taken action to pick up the fallen item and maintain control over it throughout the remainder of the ride. The alert may include an indication of the location of the item (e.g., under the rear-facing seat, under the front-facing seat, etc.) as well as other helpful information, such as an identity of the object (e.g., pen, book, mobile device, etc.)

In step 712, the LIMB database is updated to indicate that the owner has retrieved the fallen item. As a result, no further action is necessary.

Returning to step 706, if a determination is made that the owner of the detected fallen item is no longer in the vehicle, execution proceeds to step 714.

In step 714, a determination is made whether the owner of the item as indicated in the LIMB database would like the item returned. For example, in some embodiments, user information associated with the owner and stored in the user database may be accessed to initiate a call by a customer service representative (or by an automated service) to the owner. If it is determined in step 714 that the owner would like the item returned, execution proceeds to step 716.

In step 716, arrangements are made with the owner for the item to be returned to the owner. For example, the owner may be instructed to pick up the item at a secure and/or central location, such as a customer service center operated by or in association with the autonomous vehicle service provider. Alternatively, in some embodiments, the vehicle in which the item was dropped may be dispatched to a location designated by the owner such that the owner may retrieve it directly from the vehicle. The arrangements made with the owner for returning the item may depend on various factors, including but not limited to the size of the vehicle fleet, the loyalty of the customer, and the number of central locations available for storage of lost items. Once the owner retrieves the lost item, the LIMB database is updated to indicate that the item has been returned to the owner.

Returning to step 714, if it is determined that the item is not desired by the owner (e.g., the owner does not respond to attempts by customer service to contact the owner or the item is determined to be trash or other refuse), execution proceeds to 718.

In step 718, arrangements are made for the vehicle to return to a service or maintenance center associated with the transportation service provider so that the item may be removed from the vehicle by an individual (e.g., a service technician) before the vehicle is returned to active service. Additionally, the LIMB database may be updated accordingly to reflect that the item was unclaimed and/or designated as trash or other refuse.

Although the operations of the example method shown in FIGS. 6 and 7 are illustrated as occurring once each and in a particular order, it will be recognized that the operations may be performed in any suitable order and repeated as desired. Additionally, one or more operations may be performed in parallel. Furthermore, the operations illustrated in FIGS. 6 and 7 may be combined or may include more or fewer details than described. Still further, one or more operations may be omitted.

Select Examples

Example 1 provides a method comprising determining that an object has fallen to a surface of interest in an interior cabin of a vehicle during a transportation service provided using the vehicle; tracking a location of the object on the surface of interest using at least one interior sensor; updating tracking information for the object, the tracking information including the tracked location of the object and a time at which the location was tracked; inferring a continued existence of the object after the object has moved out of a view of the at least one interior sensor and tagging the object as obscured from view in the tracking information for the object; identifying a user associated with the transportation service; and alerting the identified user to retrieve the object.

Example 2 provides the method of example 1, further comprising determining an identity of the object using sensory data from the at least one interior sensor.

Example 3 provides the method of example 2, wherein the tracking information for the object includes the identity of the object.

Example 4 provides the method of any of examples 1-3, further comprising determining whether the user has departed the cabin of the vehicle; and if the user has departed the cabin of the vehicle, contacting the user to arrange for a return of the object to the user.

Example 5 provides the method of any of examples 1-4, wherein the contacting the user comprises at least one of calling the user, texting the user, emailing the user, and messaging the user via a user application associated with the transportation service.

Example 6 provides the method of any of examples 1-5, further comprising determining whether the user wants the object returned; and if the user wants the object returned, facilitating a return of the object to the user.

Example 7 provides the method of example 6, further comprising, if the user does not want the object returned, removing the object from the vehicle during servicing of the vehicle.

Example 8 provides the method of example 3, wherein if the identity of the object is determined to be trash, returning the vehicle to a service center for the object to be removed from the vehicle.

Example 9 provides the method of any of examples 1-8, further comprising when the object returns to the view of the at least one interior sensor, removing the OOS tag from the tracking information for the object.

Example 10 provides the method of any of examples 1-9, wherein the at least one interior sensor comprises at least one camera.

Example 11 provides the method of any of examples 1-10, further comprising at least one auxiliary sensor for tracking the location of the object when the object is out of the view of the at least one interior sensor.

Example 12 provides the method of example 11, wherein the at least one auxiliary sensor comprises at least one of a weight sensor, a touch sensor, an ultrasonic sensor, and a laser sensor.

Example 13 provides the method of example 11, wherein the at least one auxiliary sensor is arranged such that sensory data from the at least one auxiliary sensor can be used to track the object when the object is occluded from the view of the at least one interior sensor.

Example 14 provides the method of any of examples 1-13, further comprising providing a physical barrier in the cabin to inhibit the object from moving out of the view of the at least one interior sensor.

Example 15 provides a method comprising detecting using sensory data from at least one interior sensor provided in a cabin of a vehicle that an object has been left in an occluded area of the vehicle cabin during a transportation service provided using the vehicle; determining the user associated with the transportation service; determining an identity of the object using the sensory data; if the identity of the object is not trash, contacting the user to arrange for return of the object to the user; and if the identity of the object is trash, returning the vehicle to a service station associated with transportation service provider, wherein the object is removed from the vehicle at the service station.

Example 16 provides the method of example 15, further comprising, if the owner does not want the object returned, returning the vehicle to a service station associated with transportation service provider, wherein the object is removed from the vehicle at the service station.

Example 17 provides the method of any of examples 15-16, further comprising, if the user is a passenger in the vehicle, alerting the user to the location of the object before the transportation service is terminated.

Example 18 provides the method of example 17, wherein the user is alerted using a mobile device associated with the user.

Example 19 provides the method of example 17, wherein the user is alerted using at least one of a display provided in the vehicle and a speaker provided in the vehicle.

Example 20 provides the method of example 17, further comprising determining whether the object has been returned to the user; and after the object has been returned to the owner, updating a lost object management database to indicate the object has been returned to the owner.

Example 21 provides the method of example 20 wherein the determining is performed using the sensory data from the at least one interior sensor.

Example 22 provides the method of any of examples 15-21, further comprising, if the user is not a passenger in the vehicle, retaining the object at a central location and inviting the user to retrieve the object from the central location.

Example 23 provides the method of any of examples 15-22, further comprising, after the owner retrieves the object from the central location, updating a lost object management database to indicate that the object has been retrieved.

Example 24 provides a LOT system for a vehicle, the LOT system comprising an interior sensor provided in a cabin of the vehicle; a LOT control module that tracks a location of an object on a surface of interest within the cabin using sensory data from the interior sensor when the object is not occluded from a view of the interior sensor and infers the location of the object when the object is occluded from the view of the interior sensor; and a LOT communications module that identifies an owner of the object and for alerts the owner to retrieve the object.

Example 25 provides the LOT system of example 24, further comprising at least one auxiliary sensor that provides secondary sensory data for use in inferring the location of the object when the object is occluded from the view of the at least one interior sensor.

Example 26 provides the LOT system of example 25, wherein the at least one auxiliary sensor comprises at least one of a weight sensor, a touch sensor, an ultrasonic sensor, and a laser sensor.

Example 27 provides the LOT system of example 25, wherein the at least one auxiliary sensor is arranged such that sensory data from the at least one auxiliary sensor can be used to track the object when the object is occluded from the view of the at least one interior sensor.

Example 28 provides the LOT system of any of examples 24-27, wherein the vehicle is an autonomous vehicle.

Example 29 provides the LOT system of any of examples 24-27, wherein the at least one interior sensor comprises a camera.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to conduct those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A method comprising:
   determining that an object has fallen to a surface of interest in an interior cabin of a vehicle during a transportation service provided using the vehicle;
   determining a location of the object on the surface of interest using at least one interior sensor;
   updating tracking information for the object, the tracking information including the determined location of the object and a time at which the location was determined;
   updating, in response to the object moving out of a view of the at least one interior sensor, the tracking information with the location of the object at a time at which the object moved out of the view of the at least one interior sensor;
   inferring a continued existence of the object when the object is out of the view of the at least one interior sensor, tagging the object as obscured from view in the tracking information for the object, and inferring the location of the object based on a tilt and a speed of the vehicle;
   identifying a user associated with the transportation service; and
   alerting the identified user to retrieve the object, the alert including the location of the object.

2. The method of claim 1, further comprising determining an identity of the object using sensory data from the at least one interior sensor, wherein the tracking information for the object includes the identity of the object.

3. The method of claim 1, further comprising:
   determining whether the user has exited the cabin of the vehicle; and
   if the user has exited the cabin of the vehicle, contacting the user to arrange for a return of the object to the user.

4. The method of claim 3, wherein the contacting the user comprises at least one of telephoning the user, texting the user, emailing the user, and messaging the user via a user application associated with the transportation service.

5. The method of claim 1, further comprising:
   determining whether the user wants the object returned;
   if the user wants the object returned, facilitating a return of the object to the user; and
   if the user does not want the object returned, removing the object from the vehicle during servicing of the vehicle.

6. The method of claim 1, further comprising, when the object returns to the view of the at least one interior sensor subsequent to being out of the view of the at least one interior sensor, removing an out of sight (OOS) tag from the tracking information for the object.

7. The method of claim 1, wherein the at least one interior sensor comprises at least one camera.

8. The method of claim 1, further comprising at least one auxiliary sensor for tracking the location of the object when the object is out of the view of the at least one interior sensor, wherein the at least one auxiliary sensor comprises at least one of a weight sensor, a touch sensor, an ultrasonic sensor, and a laser sensor and wherein the at least one auxiliary sensor is arranged such that sensory data from the at least one auxiliary sensor is used to track the object when the object is out of the view of the at least one interior sensor.

9. A method comprising:
   detecting, using sensory data from at least one interior sensor provided in a cabin of a vehicle, that an object is in an occluded area of the vehicle cabin during a transportation service provided using the vehicle;
   inferring, based on a tilt and a speed of the AV, a location of the object when the object is in the occluded area of the vehicle cabin;
   identifying a user associated with the transportation service;
   determining an identity of the object using the sensory data;
   if the identity of the object is not trash, contacting the user to arrange for return of the object to the user; and
   if the identity of the object is trash, returning the vehicle to a service station associated with a provider of the transportation service to enable removal of the object from the vehicle.

10. The method of claim 9, further comprising, if the owner does not want the object returned, returning the vehicle to the service station to enable removal of the object from the vehicle.

11. The method of claim 9, further comprising, if the user is a passenger in the vehicle, alerting the user to the location of the object before the transportation service ends and the user exits the vehicle.

12. The method of claim 11, wherein the user is alerted using at least one of a mobile device associated with the user, a display provided in the vehicle, and a speaker provided in the vehicle.

13. The method of claim 11, further comprising:
   determining whether the object has been returned to the user; and
   after the object has been returned to the owner, updating a lost object management database to indicate the object has been returned to the owner.

14. The method of claim 13, wherein the determining is performed using the sensory data from the at least one interior sensor.

15. The method of claim 9, further comprising:
   if the user is not a passenger in the vehicle, retaining the object at a central location and inviting the user to retrieve the object from the central location; and
   after the owner retrieves the object from the central location, updating a lost object management database to indicate that the object has been retrieved.

16. A lost object tracking (LOT) system for an autonomous vehicle (AV) used to provide a transportation service, the LOT system comprising:
   an interior sensor provided in a cabin of the AV;
   a LOT control module that tracks a location of an object on a surface of interest within the cabin during the transportation service using sensory data from the interior sensor when the object is not occluded from a view of the interior sensor and infers, based on a tilt and a speed of the AV, the location of the object when the object is occluded from the view of the interior sensor; and a LOT communications module that identifies an owner of the object based on the transportation service and alerts the owner to retrieve the object, wherein the alert includes the inferred location of the object.

17. The LOT system of claim 16, further comprising at least one auxiliary sensor that provides secondary sensory data used in the inferring the location of the object when the object is occluded from the view of the at least one interior sensor.

18. The LOT system of claim 17, wherein the at least one auxiliary sensor comprises at least one of a weight sensor, a touch sensor, an ultrasonic sensor, and a laser sensor.

19. The LOT system of claim 17, wherein the at least one auxiliary sensor is arranged such that sensory data from the at least one auxiliary sensor can be used to track the object when the object is occluded from the view of the at least one interior sensor.

20. The LOT system of claim 16, wherein the at least one interior sensor comprises a camera.

* * * * *